Patented Oct. 1, 1935

2,015,661

UNITED STATES PATENT OFFICE 2,015,661

PREPARATION OF SYNTHETIC RESINS

Theodore F. Bradley, Westfield, N. J., assignor to American Cyanamid Company, New York, N. Y., a corporation of Maine No Drawing. Application December 12, 1933, Serial No. 701,981. In Great Britain December 14, 1932

4 Claims. (Cl. 260—8)

This invention relates to a method of preparing resins of the polyhydric alcohol-polybasic acid type, and the products so prepared, and more particularly it is concerned with such products as have incorporated a substituent capable of retarding polymerization of the resin, so as to permit addition to, or reaction with, animal and vegetable oils.

The polyhydric alcohol-polybasic acid resins are usually prepared by condensing together a suitable polyhydric alcohol and a polybasic acid or a mixture of several of each of the ingredients, with or without the inclusion of various modifying substances. These resins, particularly those of the simple type, such as the phthalic glycerides, have a tendency to polymerize quickly on heating and when one attempts to use them in the customary coating compositions, the resin ordinarily polymerizes so quickly when heated that suitable results are not obtained.

The present invention is directed to the condensation of the polyhydric alcohol and the polybasic acid in the presence of small amounts of an urea to produce a resin which is slow to polymerize and which can be successfully used in coating compositions. Thus glycerol and phthalic anhydride may be condensed together to form a glycerol phthalate resin which polymerizes quite rapidly when the resin is heated. However, if the glycerol and phthalic acid are condensed in the presence of a small amount of an urea, the urea combines with the other ingredients and the result is a modified glycerol phthalate having the property of being very slow to gel or polymerize. These modified resins are easily blended or reacted with drying, semi-drying or non-drying oils by cooking the resin with the oil or by reacting the various ingredients as will be described more particularly below.

One specific means of carrying out the invention involves the placing of 20 parts of phthalic anhydride in a suitable vessel with 10 parts of glycerol and 1 part of urea. The mixture is heated to about 230° C. in thirty minutes and is then carried to about 290° C. in about thirty minutes additional. The product obtained, upon cooling, is a resinous mass which resists gelling or polymerization even though heated for a comparatively long period of time at rather high temperatures. Under similar conditions straight phthalic glyceride would polymerize or gel to a hard, insoluble and infusible solid.

The modified resin prepared as described may be blended with an oil by taking 50 parts by weight of the resin and mixing it with 60 parts by weight of linseed oil. The mixture is heated to about 300° C. and held at that point until blending or combination is effected. Complete combination usually results in about 20 to 30 minutes. This product may be used as such for coating purposes by the inclusion of additional oil and/or solvents and the other usual ingredients of coating compositions. The resinous masses are also capable of being used as bases in molding compositions.

Another and more preferred method of preparing the resins consists in first heating a mixture of 148 parts by weight of phthalic anhydride with 10 parts by weight of urea to a temperature of about 160–170° C. until ebullition ceases. There is then added 76 parts of glycerol and the temperature of the mix is gradually raised to 290° C. and held at that point for about one-half hour. The product obtained is a plastic resin of amber color. This resin is also susceptible of being heated for long periods of time without substantial polymerization. The resin can be blended or combined with oils as described above.

If desired incorporation of the oil may be carried out by interaction of all of the ingredients substantially simultaneously. Thus, 74 parts phthalic anhydride are heated with about 5 parts of urea to a temperature of about 160° C. for a short time until reaction takes place. To this there are then added 38 parts glycerol, 40 parts linseed oil and 60 parts tung oil, the entire mixture being then heated to temperatures of 290–310° C. until blending or combination is effected.

The resinous products described are suitable for use in the various commercial coating compositions which are formulated with more or less material of a resinous nature. For example, the instant resins may be dissolved in a suitable solvent such as xylene or any suitable solvent mixtures, the resin being used in sufficient proportion to obtain the desired viscosity characteristics. To the solutions, there may be added, if desired, oils, driers, pigments, and other ingredients usually found in these coating compositions. Coating compositions suitable for baking or air-drying may be formulated with my resins.

The resinous products of the present invention are also suitable for use in molding compositions, the practice of that art being followed generally with the substitution of the present resins for the previously used materials.

In place of the phthalic acid and glycerol of the examples, there may be substituted, in whole or in part, any of the various well-known equivalent polybasic acids and polyhydric alcohols, or any desired mixtures thereof to obtain resins having characteristics suitable for the desired purposes.

The resins of the present invention are adapted to be blended or combined with practically all of the glyceride oils of animal or vegetable origin, but are particularly valuable for use with the drying oils. It is to be noted that the fatty acids of the oils are not utilized, as such, in the present process.

It will be obvious that many changes may be made in the details of carrying out the process in accordance with the results desired. Times and temperatures of heating may be varied within wide limits. It is essential, however, that an urea compound be utilized in the condensation reaction. In place of urea itself, thiourea or the like may be used. The proportions of the substituents of the resins may be varied to obtain the desired results, the amount of the urea compound being generally kept as low as practicable. Suitable other changes and modifications may be made without departing from the spirit of the invention.

What I claim is:

1. The process which comprises reacting a relatively small amount of a material selected from the group consisting of urea and thiourea with a polybasic carboxylic acid and then combining the reaction product with a polyhydric alcohol and a glyceride oil.

2. The process which comprises reacting a relatively small amount of a material selected from the group consisting of urea and thiourea with a polybasic carboxylic acid, combining the reaction product with a polyhydric alcohol, and heating the combination with a glyceride oil.

3. The process which comprises reacting a relatively small amount of urea with phthalic anhydride, and combining the reaction product with glycerin and a glyceride oil.

4. The process which comprises reacting a relatively small amount of urea with phthalic anhydride, combining the reaction product with glycerol, and heating the resultant combination with a glyceride oil.

THEODORE F. BRADLEY.